May 7, 1940.   F. W. OLIN   2,200,189
APPARATUS FOR DISPENSING HEAVY LIQUIDS
Filed April 6, 1939

INVENTOR.
FLOYD W. OLIN
BY Bodell & Thompson
ATTORNEYS.

UNITED STATES PATENT OFFICE 2,200,189

APPARATUS FOR DISPENSING HEAVY LIQUIDS

Floyd W. Olin, Hapeville, Ga., assignor to Oswego Falls Corporation, Fulton, N. Y., a corporation of New York Application April 6, 1939, Serial No. 266,322

6 Claims. (Cl. 226—124)

This invention relates to apparatus for dispensing liquids and more particularly to an apparatus for dispensing liquids into containers, such for example as milk bottles.

The conventional structure of such apparatus consists generally of a dispensing tube depending from a tank or supply of liquid, such as milk, and a valve member arranged in the tube, the valve member consisting of a conical shaped base portion and a vent stem extending upwardly therefrom within the dispensing tube. The arrangement is such that there is relative axial movement between the dispensing tube and the valve. A spring is employed to normally maintain the lower end of the dispensing tube and the conical base of the valve in engagement, and during the filling operation relative axial movement is effected between the tube and the valve by engagement of the lower end of the tube with the top of the bottle and accordingly, the milk or liquid is dispensed through the tube over the conical surface of the valve. The air displaced in the bottle is permitted to pass upwardly through the interior of the valve and the vent stem.

While this dispensing apparatus works satisfactory for milk and light cream, or with liquids of comparable viscosity, the apparatus does not work satisfactory with heavy liquids, such as heavy cream, buttermilk etc. This is due to the fact that because of the greater viscosity of the liquid, it tends to follow across the bottom of the valve and thereby shutting off the vent opening. Various constructions have been employed to overcome this difficulty, such for example as adding a deflector element to one side of the conical valve surface in order to prevent a continuous formation of liquid across the bottom of the valve.

This invention has as an object a dispensing apparatus of the type above referred to and which embodies a construction which is particularly economical and efficient and which prevents the accumulation of liquid across the bottom of the valve and accordingly, dispensing apparatus involving my invention may be used with liquids of high viscosity without affecting the proper venting of the receptacle during the filling operation.

The invention consists in the novel features and in the combinations and constructions hereinafter set forth and claimed.

In describing this invention, reference is had to the accompanying drawing in which like characters designate corresponding parts in all the views.

Figure 1:
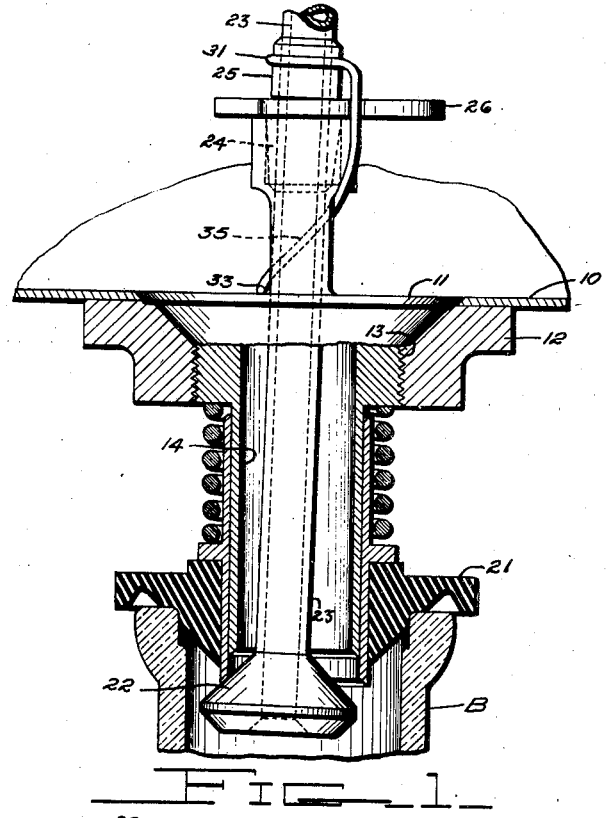
Figure 1 is a vertical sectional view of a dispensing apparatus embodying my invention and contiguous portion of the vat and top of the bottle, the apparatus being illustrated during the filling operation.

10 designates the bottom of a vat or receptacle containing the liquid to be dispensed and which is provided with an opening 11 beneath which is secured a flange 12 threaded internally as at 13 to receive the dispensing apparatus.

The dispensing apparatus consists generally of a tubular member 14 provided with an externally threaded portion threaded into the flange 20 12 and with an integral arch-shaped support having leg portions 15 and a central portion 16 provided with a bore to slidably receive the stem of the valve, as hereinafter explained. The dispensing tube further includes, in the structure shown, a sleeve 18 slidably mounted upon the lower end of the member 14 and provided with a radially extending flange 19. The sleeve 18 is encircled by a helical compression spring 20 which coacts with the flange 18 to yieldingly urge the sleeve 18 downwardly into engagement with the valve. The lower end of the sleeve 18 is provided with a rubber gasket 21 for engagement with the top of the bottle B.

The valve member consists of a conical base portion 22 and a vent stem 23 extending upwardly from the apex of the base 22 through the tube 14 and the central portion 16 of the support. The lower end of the dispensing tube, or the sleeve 18 thereof, is chamfered or beveled complemental to the conical surface of the base 22 of the valve. The upper portion of the vent stem 23, which extends through the central portion 16 of the support, is provided with an enlarged portion 24, and the stem is likewise provided with an enlarged portion 25 immediately above the support. The enlarged portions 24, 25 are spaced apart to permit the bifurcated key 26 to be placed about the stem to detachably hold the same against downward movement when the conical base 22 is engaged by the lower end of the dispensing tube or sleeve 18 under the action of spring 20.

The structure thus far described is of conventional design. During the filling operation, the bottle B engages the gasket 21 and relative axial movement is accordingly effected between the valve member and the dispensing tube. That is, the sleeve 18 is moved upwardly against the action of the spring 20 and accordingly, the milk or liquid is permitted to flow through the tube 14 and over the conical surface 22, the air in the bottle being permitted to escape through the hole 30 provided in the base and stem of the valve. During the relative movement between the valve stem and the dispensing tube, the valve is maintained substantially in coaxial relationship to the tube and the liquid flows over the entire conical surface of the valve, with the result that if the liquid is of high viscosity, as for example heavy cream or buttermilk, it will follow across on the under side of the valve 22 and shut off the hole 30. I overcome this disadvantage by providing means operable to cant the valve during the filling operation. That is, to maintain one side of the conical base 22 of the valve in engagement with one side of the dispensing tube.

To accomplish this action, I employ a bifurcated spring member formed with a central semi-circular portion 31 engaging the valve stem above the support, and a pair of depending leg portions 32 terminating in outwardly flaring curved ends 33. The leg portions 32 are arranged on one side of the legs 15 of the arch-shaped support, and are then sprung inwardly under the legs of the support, as indicated at 35, Figure 1, with the curved ends 33 engaging the opposite sides of the legs 15 near their joinder with the tube 14. Accordingly, the top of the valve stem 23 is yieldingly urged in one direction, as to the right Figure 1, and the lower end of the valve stem, including the base portion 22, is urged to the opposite side of the axis of the dispensing tube and into engagement with one side of the lower end thereof. During the filling operation, as indicated in Figure 1, the base portion 22 of the valve assumes an eccentric relation to the dispensing tube permitting the liquid to be dispensed and to flow over the major portion of the conical valve surface, however, preventing the liquid from flowing over that portion of the valve surface in engagement with the side of the tube. In view of the fact that the flow of liquid is interrupted over a portion of the valve surface, it accordingly will not form a continuous sheet beneath the valve to cut off the venting aperture.

Figures 2, 3:
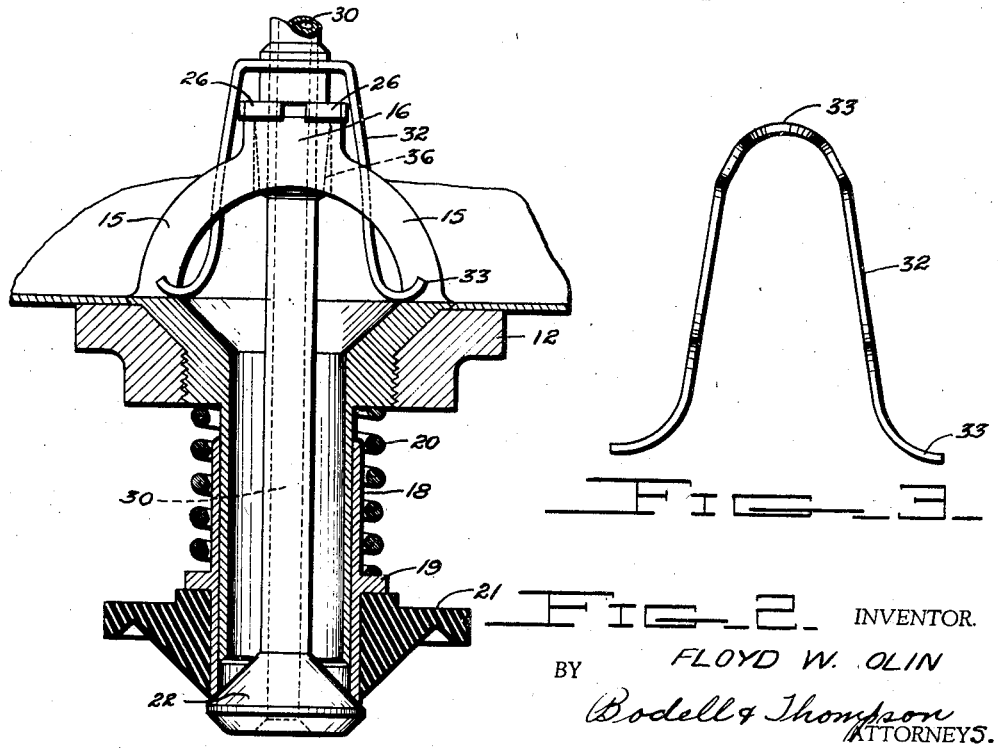
Figure 2 is a view, similar to Figure 1, illustrating the apparatus in the normal or closed position.
Figure 3 is a perspective view of the spring member to effect canting of the valve.

The bore in the central portion 16 of the arch-shaped support may be slightly enlarged, or the enlarged portion 24 on stem 23 may be tapered slightly, as indicated at 36, Figure 2, in order to permit the valve to be more readily canted.

It will be observed that the construction described does not affect the conventional dispensing valve structure now in use, and the cost of the structure described over the cost of the conventional dispensing valve is nominal. The structure of my invention is not only economical in cost, but highly efficient in operation, and does not in any way hinder the disassembly of the valve structure for cleaning and sterilizing.

What I claim is:

1. A liquid dispensing apparatus comprising a dispensing tube, a conical valve member having a vent stem extending upwardly from the apex thereof into said tube, means operable to yieldingly hold said tube and valve in engagement to prevent the discharge of liquid from said tube, said tube and valve being arranged to have relative axial movement to permit discharge of liquid from the tube over the conical surface of said valve, and means cooperable with said vent stem upon such relative movement between the tube and valve to cant said valve to maintain one side of said conical surface in engagement with the lower end of the tube.

2. A liquid dispensing apparatus comprising a dispensing tube, a valve member, said valve member having a conical base portion and a vent stem extending upwardly from the apex of said base portion into said tube, means operable to yieldingly maintain the conical base portion of said valve in engagement with the lower end of said tube to prevent the discharge of liquid therefrom, said tube and valve being arranged to have relative axial movment, and means yieldingly urging said valve to one side of said tube.

3. A liquid dispensing apparatus comprising a dispensing tube, a valve member, said valve member including a conical base portion and a vent stem extending upwardly from the apex of said base into said tube, a support member provided with an aperture to receive said stem, means yieldingly urging the base portion of said valve and the lower end of said dispensing tube into engagement to prevent the discharge of liquid from said tube, and means cooperable with said support and said valve stem to yieldingly urge said valve into engagement with one side of said dispensing tube.

4. A liquid dispensing apparatus comprising a dispensing tube, a valve member arranged in said tube, said valve member comprising a conical base portion cooperable with the lower end of said tube and a vent stem extending upwardly from the apex of said base portion into said tube, a support arranged above the tube and being provided with an aperture to receive said stem, spring means yieldingly urging the base portion of said valve and the lower end of said dispensing tube into engagement to prevent the discharge of liquid from said tube, said tube and valve being arranged to have relative axial movement to permit discharge of liquid from said tube over the conical surface of said valve, and spring means cooperating with said support and said valve stem to yieldingly urge said conical base portion of the valve into engagement with one side of said tube during such relative movement between the valve and said tube.

5. In a bottle filler valve, a liquid discharge tube, a valve member positioned at the end of said tube and normally effecting closure thereof, a support for said valve member positioned within said discharge tube, said tube and said support being relatively movable to unseat said valve member from said tube end and open said tube for the flow of liquid therethrough, and means operable, when said valve member is in opened position, to move said support and said valve member to one side of said discharge tube.

6. In a bottle filler valve, a liquid discharge tube, a vent tube positioned within and extending through said discharge tube, a valve member supported on said vent tube and normally positioned to endwardly close said discharge tube, said discharge tube and said valve member being relatively movable to open said discharge tube for the flow of liquid therethrough, and means operable, when said valve member is in opened position, to laterally move said vent tube and said valve member to one side of said discharge tube.

FLOYD W. OLIN.